United States Patent
Kerber

(10) Patent No.: US 10,505,951 B2
(45) Date of Patent: Dec. 10, 2019

(54) SYSTEM AND METHOD FOR MONITORING WIRELESS SESSIONS

(71) Applicant: IO3O LLC, Oklahoma City, OK (US)

(72) Inventor: John Kerber, Oklahoma City, OK (US)

(73) Assignee: IO3O, LLC, Oklahoma City, OK (US)

( * ) Notice: Subject to any disclaimer, the term of this patent is extended or adjusted under 35 U.S.C. 154(b) by 188 days.

(21) Appl. No.: 15/584,831

(22) Filed: May 2, 2017

(65) Prior Publication Data

US 2017/0316016 A1 Nov. 2, 2017

Related U.S. Application Data

(60) Provisional application No. 62/330,521, filed on May 2, 2016.

(51) Int. Cl.

| | |
|---|---|
| H04L 29/06 | (2006.01) |
| G06F 16/11 | (2019.01) |
| H04L 29/08 | (2006.01) |
| H04W 12/12 | (2009.01) |
| H04W 12/08 | (2009.01) |
| H04W 24/04 | (2009.01) |
| G06F 16/174 | (2019.01) |
| G06F 16/00 | (2019.01) |
| H04W 24/08 | (2009.01) |

(52) U.S. Cl.
CPC ........ *H04L 63/1408* (2013.01); *G06F 16/128* (2019.01); *H04L 63/0876* (2013.01); *H04L 63/10* (2013.01); *H04L 63/1416* (2013.01); *H04L 67/12* (2013.01); *H04W 12/08* (2013.01); *H04W 12/12* (2013.01); *H04W 24/04* (2013.01); *G06F 16/00* (2019.01); *G06F 16/174* (2019.01); *H04W 24/08* (2013.01)

(58) Field of Classification Search
CPC . H04L 63/1408; H04L 63/1416; H04L 67/12; H04L 63/0876; H04L 63/10; H04W 12/08; H04W 12/12; H04W 24/04; G06F 16/128

See application file for complete search history.

(56) References Cited

U.S. PATENT DOCUMENTS

| | | | |
|---|---|---|---|
| 9,119,070 B2 * | 8/2015 | Brindza | H04L 63/10 |
| 9,137,670 B2 * | 9/2015 | Gray | H04L 63/1416 |
| 9,525,689 B2 * | 12/2016 | Batta | H04L 63/10 |
| 9,961,079 B1 * | 5/2018 | Wang | H04L 63/0876 |
| 2007/0298720 A1 * | 12/2007 | Wolman | H04L 63/1408 455/66.1 |

(Continued)

OTHER PUBLICATIONS

Comza, Nicole, "See Who is using your WiFi on Windows", Cnet.com, Jul. 18, 2014.*

(Continued)

*Primary Examiner* — Ramy M Osman
(74) *Attorney, Agent, or Firm* — Dunlap Codding, P.C.

(57) ABSTRACT

Systems and methods are disclosed for determining session counts for one or more devices on a network. Generally, one or more devices using a network at a pre-determined time are identified and an inventory with a device snapshot and device cache is created. Session counts for the one or more devices on the network are based on the device snapshots and device caches, and the session counts may be provided in a session count report.

20 Claims, 8 Drawing Sheets

(56) References Cited

U.S. PATENT DOCUMENTS

| | | | | |
|---|---|---|---|---|
| 2010/0136953 | A1* | 6/2010 | Twell | H04W 4/00 455/414.1 |
| 2011/0106882 | A1* | 5/2011 | Takakura | H04L 67/10 709/203 |
| 2011/0243003 | A1* | 10/2011 | Oguchi | H04W 76/19 370/252 |
| 2015/0036515 | A1* | 2/2015 | Fayssal | H04L 43/028 370/252 |
| 2016/0117458 | A1* | 4/2016 | Hermans | G06F 19/00 705/2 |
| 2016/0371591 | A1* | 12/2016 | Reddy | G06Q 10/06393 |
| 2017/0245138 | A1* | 8/2017 | Waldner | H04W 4/80 |
| 2017/0316016 | A1* | 11/2017 | Kerber | H04W 24/04 |

OTHER PUBLICATIONS

Who's on My Wifi, "Simple Secure Router", whoisonmywifi.com/router , archive dated Apr. 29, 2015.*

Who's on My Wifi, "Home Page", whoisonmywifi.com, archive dated Apr. 29, 2015.*

Who's on My Wifi, "Blog", whoisonmywifi.com/blog , archive dated Mar. 16, 2015.*

Screenshot of *Who Is on My Wifi v2.0—Help Guide* welcome page, software program, dated Jun. 25, 2014.

Screenshot of *Who Is on My Wifi v2.0—Help Guide*, software program, dated Oct. 4, 2013.

*What Exactly Does This Do?*. Who Is on My Wifi Support Forum, phpBB Forum Software, dated Aug. 1, 2014, www.whoisonmywifi.com/forum/viewtopic.php.

*Which Devices Can Who's on My Wifi Detect?*. Who Is on My Wifi Support Forum, phpBB Forum Software, dated Aug. 1, 2014, www.whoisonmywifi.com/forum/viewtopic.php.

*Relax Knowing Your Wireless is Safe*, Who's on My Wifi, dated Jun. 25, 2014, http://www.whoisonmywifi.com/.

*Who's on My Wifi Online*, Who's on My Wifi, dated Jul. 2, 2014, http://www.whoisonmywifi.com/online/.

*FAQ*, Who Is on My Wifi Support Forum, dated Jul. 1, 2014, http://www.whoisonmywifi.com/forum/viewforum.php.

*What Is the Difference Between Free and Online?*, Who Is on My Wifi Support Forum, dated Aug. 1, 2014, http://www.whoisonmywifi.com/forum/viewtopic.php.

* cited by examiner

Who's On My WIFI Agent Sends Device Inventory or Anonymized Device Inventory to Online API or Other Sevice

| Record Type | Session Date | Mac Address | Device Description | Session Start Time | Session End Time | Device Detected Count |
|---|---|---|---|---|---|---|
| Single Session | March 14th, 2016 | 14 cc.20 | Type in New Name | March 14, 2016 7:02pm | March 14, 2016 11:57am | 53 Times |
| Single Session | March 14th, 2016 | A4 77.33 | Chromecast.lan | March 14, 2016 7:02pm | March 14, 2016 11:57am | 53 Times |
| Single Session | March 14th, 2016 | 64.66.B3 | The404 | March 14, 2016 7:02pm | March 14, 2016 11:57am | 53 Times |
| Single Session | March 14th, 2016 | 54.B6.DA | dlinkrouter.lan | March 14, 2016 7:02pm | March 14, 2016 11:57am | 53 Times |
| Single Session | March 14th, 2016 | 68.TC.A2 | Type in name | March 14, 2016 7:02pm | March 14, 2016 11:57am | 53 Times |
| Single Session | March 14th, 2016 | 74 da 36 | Type in name | March 14, 2016 7:02pm | March 14, 2016 11:57am | 53 Times |
| Single Session | March 14th, 2016 | 10 FE.ED | 404Front.lan | March 14, 2016 7:02pm | March 14, 2016 11:57am | 53 Times |
| Single Session | March 14th, 2016 | AD 3E.40 | android-94c84c804c648037.lan | March 14, 2016 7:02pm | March 14, 2016 11:57am | 53 Times |
| Single Session | March 14th, 2016 | 00:27:22 s | Type in Name | March 14, 2016 7:02pm | March 14, 2016 11:57am | 53 Times |
| Daily Session Count | March 14th, 2016 | | | | | |
| Single Session | March 15th, 2016 | 14 cc.20 | Type in Name | March 15, 2016 12:02am | March 15, 2016 11:55pm | 253 Times |
| Single Session | March 15th, 2016 | A4 17:30 | Cromecast.lan | March 15, 2016 12:02am | March 15, 2016 11:55pm | 253 Times |

FIG. 6

Devices Detected on Your Network

Network Filter Applied 404_pi

[Known] [Unknown] [Remove]

Tracked Devices: 206. Connected Device: 13. Unknown Connected 8 1 of 5

[Only Show Connected Devices]

| Block | Description | MAC Adress | IP Adress | Host name | Connected | Known/Unknown | Remove |
|---|---|---|---|---|---|---|---|
| ± | The404 | 64.66.83 08.27.00 | 000.000.000.000 | | Yes | Unknown ▷ | |
| | Type in Name | 14.CC.ED | 000.000.000.000 | | Yes | Unknown ▷ | |
| | 404trprt_pi | 10.FE.ED | 000.000.000.000 | | Yes | Unknown ▷ | |
| ☐ | Rasberrycrypt tim2 | 76.73.61 | 192.168.836.175 | | No | Known ▷ | x |
| ☐ | Type in Name | 80.27.00 | 192.168.836.032 | | No | Unknown ▷ | x |
| ☐ | Type in Name | 60.27.00 | 192.168.836.002 | | No | Unknown ▷ | x |
| ☐ | Type in Name | 78.31.01 | 192.168.836.004 | | No | Unknown ▷ | x |
| ☐ | Type in Name | | 192.168.836.035 | | No | Unknown ▷ | x |

FIG. 7

| | 46 |
|---|---|
| https:// www.whoisonmywIFI.net/device.php.cmdDevice:1sgjgsig/3c4f31s | Who's ... X |

[Home] [Networks] [Devices] [Notifications] [Reports] [Admin]

The404 — 23

- 21 — Description: The404
- Mac Address: 64.83.00
- Last Detected IP Address: 0.0.0.0
- Last ipad Address Detected: 63.23.65.34.89.36
- Last Detected ???? Name:
- Blocked: ☐
- Contributed News: Yes
- Known or Unknown: Unknown
- Mass Manufacturer: Link Technologies Inc.
- First Found on Network: December 18, 2016 11:50 AM
- Last Found on Network: March 16 2015 2:10 PM
- 21 — Hide Last Session Count: ☐
- On/Off Report: Last 24 Hours
- Digital Signature: DEG57C8C 3588A 27298
- Last Agent to Find Service: 404 fy OPENsyat-57C8C 3588A 27298 58CCC

FIG. 8

| | | | | | | |
|---|---|---|---|---|---|---|
| Record Type | Session Date | Mac Address | Device Description | Session Start Time | Session End Time | Device Detected Count |
| Single Session | March 14th, 2016 | 14 cc.20 | Type in New Name | March 14, 2016 7:02pm | March 14, 2016 11:57am | 53 Times |
| Single Session | March 14th, 2016 | A4 77.33 | Chromecast.lan | March 14, 2016 7:02pm | March 14, 2016 11:57am | 53 Times |
| Single Session | March 14th, 2016 | 64.66.B3 | The404 | March 14, 2016 7:02pm | March 14, 2016 11:57am | 53 Times |
| Single Session | March 14th, 2016 | 54.B6.DA | dlinkrouter.lan | March 14, 2016 7:02pm | March 14, 2016 11:57am | 53 Times |
| Single Session | March 14th, 2016 | 68.TC.A2 | Type in name | March 14, 2016 7:02pm | March 14, 2016 11:57am | 53 Times |
| Single Session | March 14th, 2016 | 74 da 36 | Type in name | March 14, 2016 7:02pm | March 14, 2016 11:57am | 53 Times |
| Single Session | March 14th, 2016 | 10 FE.ED | 404Front.lan | March 14, 2016 7:02pm | March 14, 2016 11:57am | 53 Times |
| Single Session | March 14th, 2016 | AD 3E.40 | android-94848480464648037.iam | March 14, 2016 7:02pm | March 14, 2016 11:57am | 53 Times |
| Single Session | March 14th, 2016 | 00:27:22s | Type in Name | March 14, 2016 7:02pm | March 14, 2016 11:57am | 53 Times |
| Daily Session Count | | | | | | |
| Single Session | March 15th, 2016 | 14 cc.20 | Type in Name | March 15, 2016 12:02am | March 15, 2016 11:55pm | 253 Times |
| Single Session | March 15th, 2016 | A4 17:30 | Cromecast.lan | March 15, 2016 12:02am | March 15, 2016 11:55pm | 253 Times |

FIG. 9

SYSTEM AND METHOD FOR MONITORING WIRELESS SESSIONS

CROSS REFERENCE TO RELATED APPLICATION

The present patent application claims priority to the provisional patent application identified by U.S. Ser. No. 62/330,521, entitled "System and Method for Monitoring Wireless Sessions," filed on May 2, 2016, the entire contents of which is hereby incorporated by reference.

BACKGROUND

In the information age, some businesses have a need to monitor wireless traffic across their wireless networks. For example, as of 2014, libraries within the United States provide reports via the Public Libraries Survey (PLS) on the number of wireless sessions at each library's wireless network. Such data is collected from approximately 9,000 public libraries across the United States. The statistics related to such wireless sessions provided by the PLS may serve to monitor trends for the development of policies and/or future initiatives.

Counting the number of visitors on a wireless network, however, is not straightforward because there is no standard definition for what a wireless session entails. For example, a visitor to a library wireless network may first log on at 10 a.m., then leave at 11 a.m., only to return at 2 p.m., finally leaving the library at 4 p.m. The wireless session count may be one, based on the individual user, or two, based on the number of times the individual user logs into the system. Both statistics may be relevant in use and statistical analysis for future trends.

Additionally, many library-owned devices may use the library wireless network in addition to visitor devices or devices within the library for public use on the wireless network. The library-owned devices may result in additional wireless sessions that do not reflect accurate use of the wireless network by the public. For example, library routers, a librarian's cellular telephone, and other devices may use the library wireless network; however, these devices may not be a relevant statistic for wireless session counts of visitors to the library, or inflate the number of wireless session counts unintentionally.

One method for counting wireless sessions may be to instruct a librarian to perform a manual headcount of everyone thought to be using the wireless network throughout the day. Another option is to have each library user click on an Acceptable Use policy in order to log into the wireless network. These options, however, provide inaccurate wireless session counts and are inflexible for monitoring such counts as well.

Thus, there is a need to provide accurate wireless session counts for devices on a wireless network.

BRIEF DESCRIPTION OF THE DRAWINGS

These and other objects and features of the present invention will be more fully disclosed or rendered obvious by the following detailed description of the invention, which is to be considered together with the accompanying drawings wherein like numbers refer to like parts, and further wherein:

FIG. 6 is an exemplary screenshot of a session count report in accordance with the present disclosure.

FIG. 7 is an exemplary screenshot of a listing of devices detected on a network.

FIG. 8 is an exemplary screenshot of a user interface for modifying one or more properties of an entry of a device detected on a network.

FIG. 9 is another exemplary screenshot of a session count report.

DETAILED DESCRIPTION OF EXEMPLARY EMBODIMENTS

Figure 1:
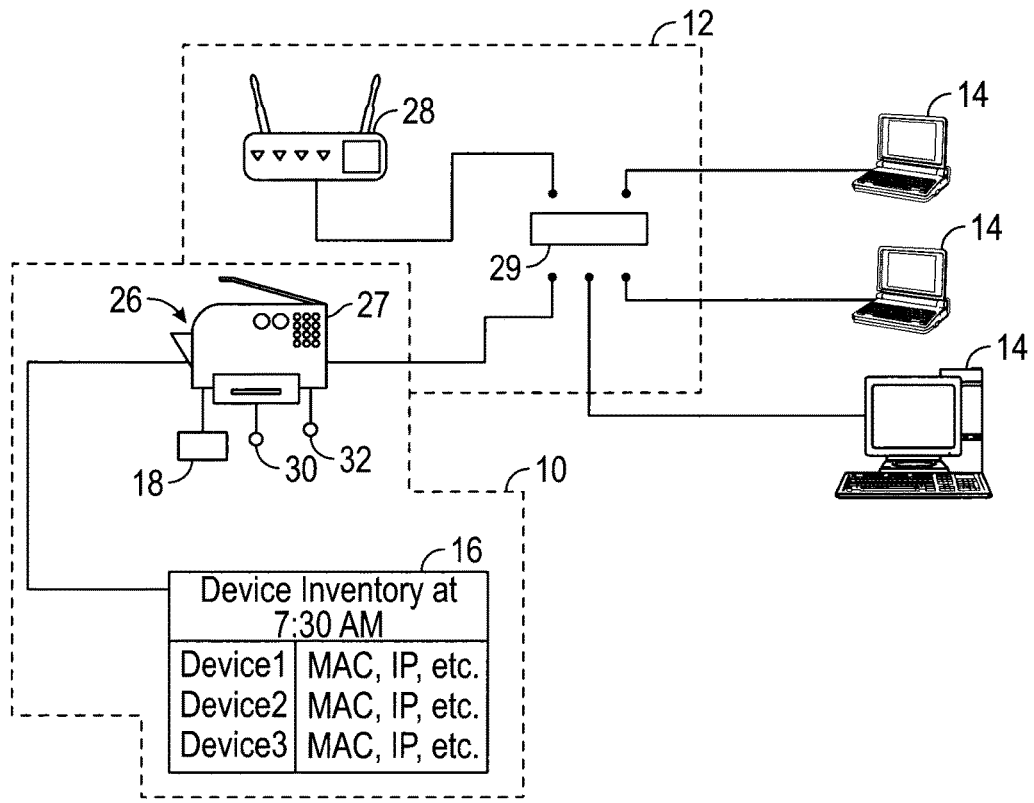
FIG. 1 is a schematic diagram of an exemplary wireless session counting system for use with one or more devices over a network, in accordance with the present disclosure.

Before explaining at least one embodiment of the presently disclosed and claimed inventive concepts in detail, it is to be understood that the presently disclosed and claimed inventive concepts are not limited in their application to the details of construction, experiments, exemplary data, and/or the arrangement of the components set forth in the following description or illustrated in the drawings. The presently disclosed and claimed inventive concepts are capable of other embodiments or of being practiced or carried out in various ways. Also, it is to be understood that the phraseology and terminology employed herein is for purpose of description and should not be regarded as limiting.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, certain well-known features may not be described in detail in order to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

The term "and combinations thereof" as used herein refers to all permutations or combinations of the listed items preceding the term. For example, "A, B, C, and combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAAB-CCCC, CBBAAA, CABABB, and so forth. A person of ordinary skill in the art will understand that typically there is no limit on the number of items or terms in any combination, unless otherwise apparent from the context.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

The use of the terms "at least one" and "one or more" will be understood to include one as well as any quantity more than one, including but not limited to each of, 2, 3, 4, 5, 10, 15, 20, 30, 40, 50, 100, and all integers and fractions, if applicable, therebetween. The terms "at least one" and "one or more" may extend up to 100 or 1000 or more, depending on the term to which it is attached; in addition, the quantities of 100/1000 are not to be considered limiting, as higher limits may also produce satisfactory results.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

Certain exemplary embodiments of the invention will now be described with reference to the drawings. In general, such embodiments relate to systems and methods for monitoring wireless session counts. For example, such embodiments may relate to systems and methods for monitoring wireless session counts based on expectations of a user.

Referring to FIG. 1, an exemplary wireless session counting system 10 is illustrated. A wireless session is a unit tracking a length of time a device 14 is connected to a network 12. In some embodiments, detection of wireless sessions may include a first instance at which the device 14 connects to the network 12 during a particular time period (e.g., a day). This wireless session may continue until the device 14 disconnects from the network 12 for a particular pre-determined length of time (e.g., one hour).

Figure 2:
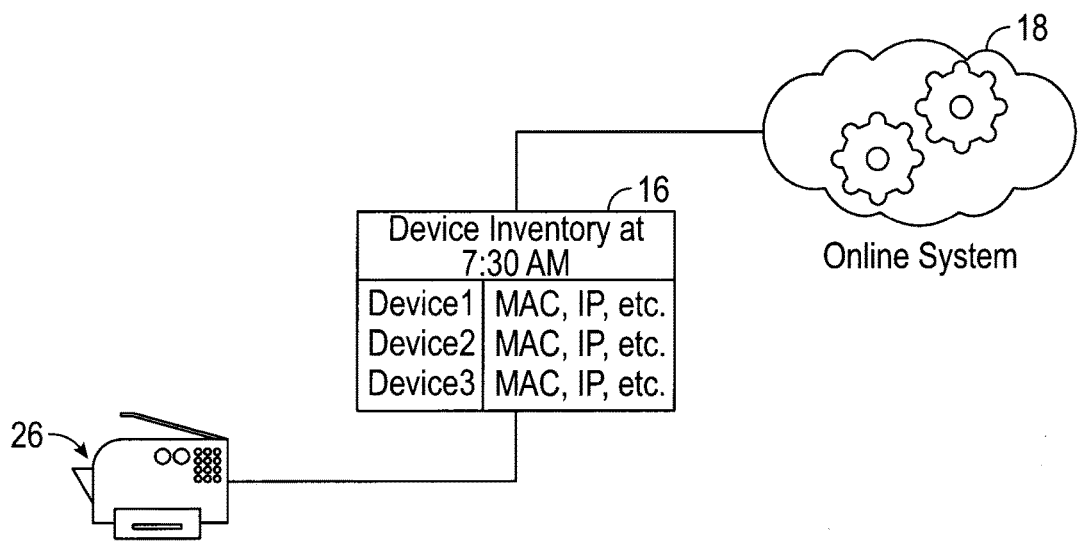
FIG. 2 is a schematic diagram of the wireless session counting system illustrated in FIG. 1 in communication with a memory for storing data of an inventory.

Generally, the wireless session counting system 10 may probe the network 12 at pre-determined times to create an inventory 16 of the devices 14 for the particular pre-determined time. The inventory 16 may be stored in a memory 18 and may include data indicative of the particular devices 14 connected to the network 12, as well as a length of time that particular devices 14 are connected to the network. In some embodiments, the memory 18 may be cloud memory as shown in FIG. 2.

The devices 14 can be one or more electronic devices for storing and processing data, typically in binary form, according to instructions in a variable program with an interface unit capable of interfacing with the network 12. For example, exemplary devices 14 include a laptop computer, a smart telephone, a tablet computer or the like.

Figure 3:
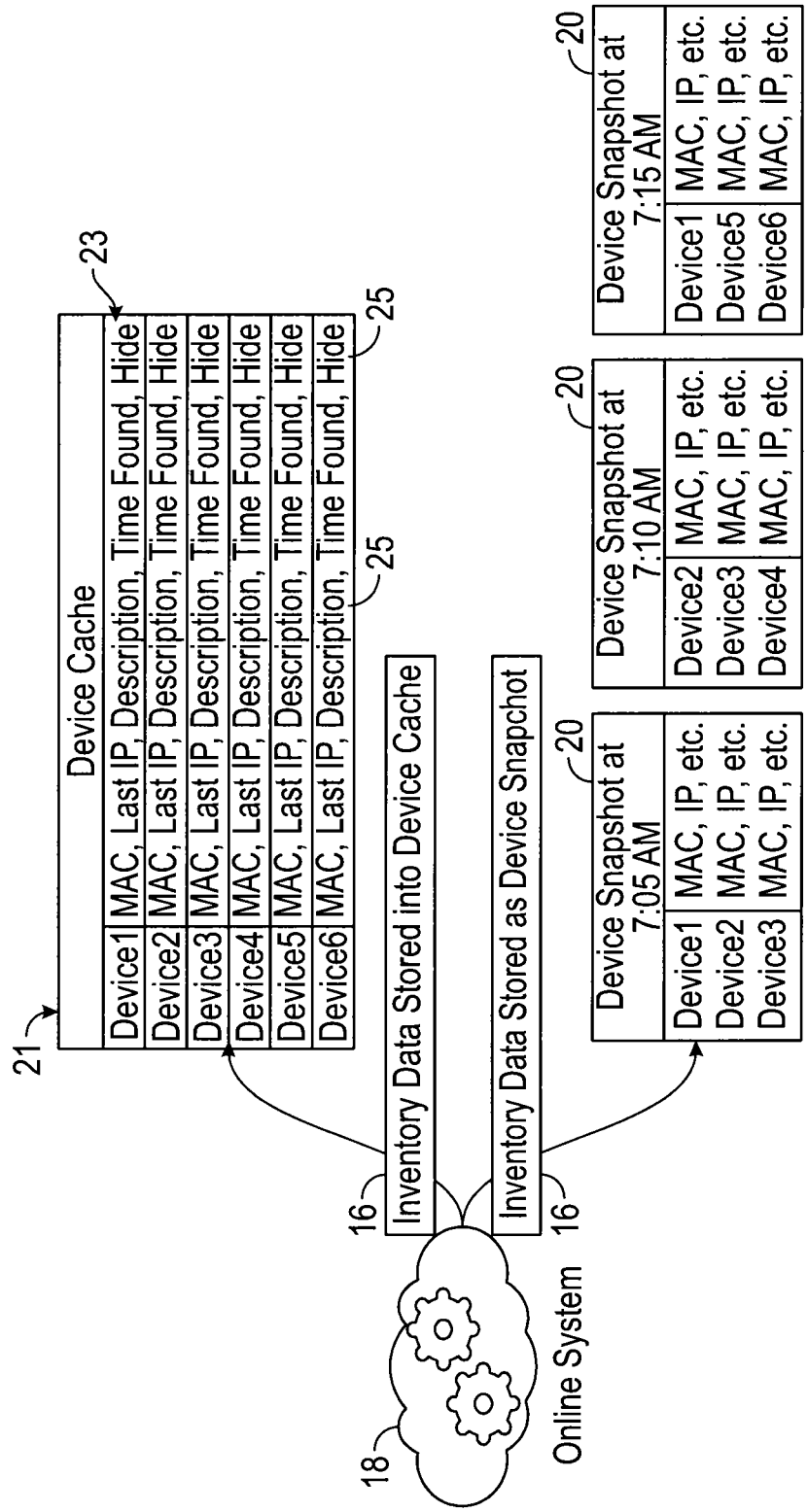
FIG. 3 is a schematic diagram of the memory illustrated in FIG. 2 having multiple devices snapshots and a device cache stored therein.

Data in the inventory 16 may be analyzed to provide device snapshots 20 (i.e., collection of information at a discrete moment in time) as shown in FIG. 3. For example, a device snapshot 20 may include a record of exactly what device(s) 14 were on the network 12 at a pre-determined time. For example, three devices, Device 1, Device 2 and Device 3, were on the network 12 at 7:05 a.m. as shown in FIG. 3. Device 2, Device 3, and Device 4 were on the network 12 at 7:10 a.m., and Device 1, Device 5, and Device 6 were on the network 12 at 7:15 a.m. It should be noted that additional data regarding one or more client devices 14 and/or the network 12 may be collected via the device snapshot 20.

In some embodiments, the inventory 16 includes a device cache 21. The device cache 21 contains one or more entries 23 with each entry 23 associated with one or more devices 14 that have been on the network 12. The device cache 21 also includes one or more properties 25 associated with the devices 14. Properties 25 may include, but are not limited to, description, IP address, Mac Address, Blocked, Connected Now, Known or Unknown, First Found on Network, Last Found on Network, Hide on Session Count, and/or the like. In some embodiments, the one or more properties 25 of the device cache 21 may be modifiable. For example, the one or more properties 25 may be modified by a trigger event and/or modified by a user.

A trigger event may serve as an event that precipitates modification of one or more properties 25. For example, the one or more properties 25 associated with one or more devices 14 listed in the device cache 21 may be modified when data is transferred to memory 18 (e.g., cloud or bulk storage system). In one example, one entry 23 of the device cache 21 may have a property 25, "Last Found on Network". The trigger event is the inventory data being transferred to memory 18. To that end, value within the property 25, "Last Found on Network", may be updated to the current time when all data, or specific pre-determined data, is transferred to memory 18 (e.g., cloud storage system).

Figure 4:
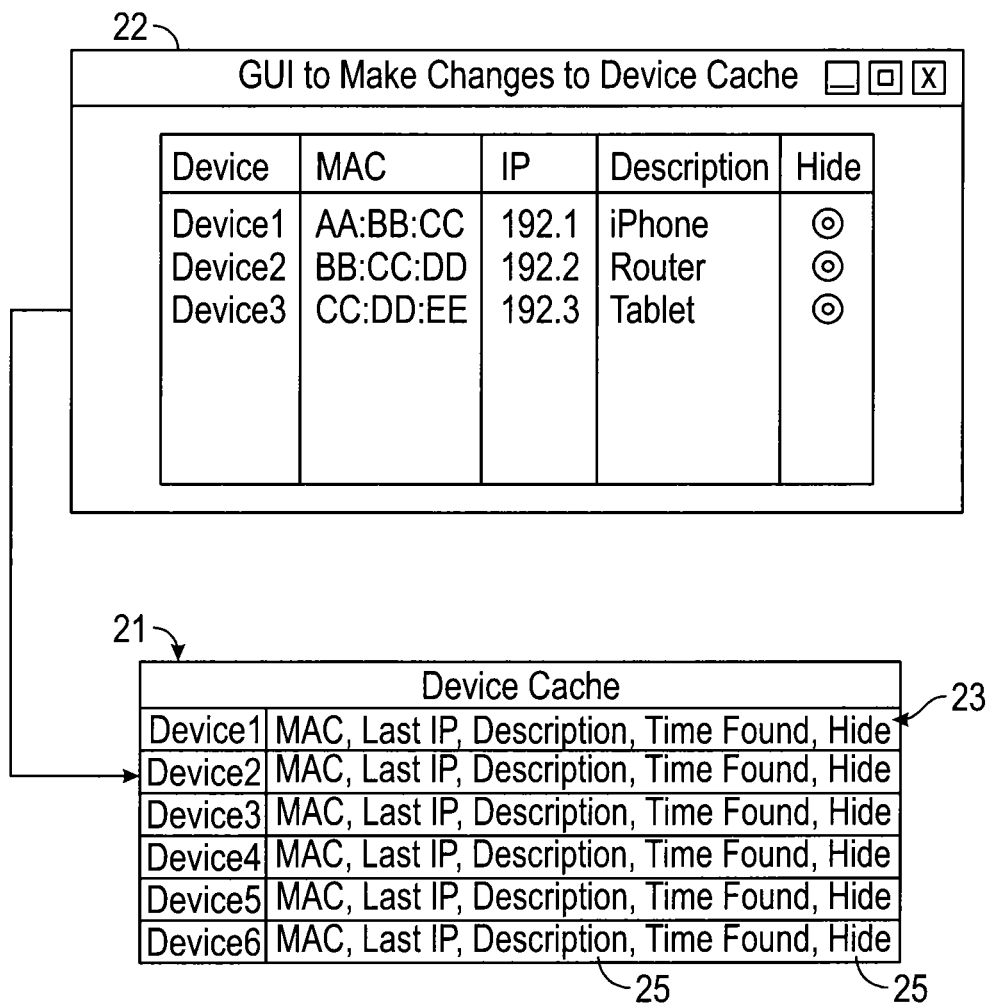
FIG. 4 is a schematic diagram of a user interface for modifying one or more properties of one or more entries in a device cache.

In some embodiments, one or more properties 25 of each entry 23 in the device cache 21 may be solely modified by a user. For example, one entry 23 of the device cache 21 may have a property 25, "Description". The property 25, "Description" may be modified by a user. The user may modify the value of the property 25, "Description" to be "Jane's iPhone". In some embodiments, the user may be provided one or more user interface 22 to modify one or more properties 25 of each entry 23 of the device cache 21 as shown in FIG. 4.

Once data in the inventory 16 is processed, the system 10 may generate one or more session count reports 24 shown in FIGS. 6 and 9. The following description will explain in further detail exemplary systems and methods for obtaining the session count reports 24.

Referring to FIG. 1, the wireless session counting system 10 may be a system or systems that are able to embody and/or execute the logic of the processes described herein. Logic embodied in the form of software instructions and/or firmware may be executed on any appropriate hardware. For example, logic embodied in the form of software instructions or firmware may be executed on a computer system, a distributed processing computer system, a router, and/or the like. In some embodiments, logic may be implemented in a stand-alone environment operating on a single computer system or router, and/or logic may be implemented in a networked environment, such as a distributed system using multiple computers and/or processors. To that end, one or more elements of logic embodied in the form of software instructions or firmware may be executed in the stand-alone environment and one or more elements of the logic may be executed in the distributed system.

In some embodiments, the wireless session counting system 10 may include a computer system 26 communicating with one or more of the devices 14 over the network 12. The computer system 26 may include one or more processors 27 working together, or independently to execute processor executable code, and one or more memories (e.g., memory 18) capable of storing processor executable code. In some embodiments, each element of the computer system 26 may be partially or completely network-based or cloud-based, and may or may not be located in a single physical location. In some embodiments, the client devices 14 may connect directly with the computer system 26. In some embodiments, the client devices 14 may connect with a separate server 29 (e.g., DHCP server), with the server 29 communicating with the computer system 26 over the network 12.

The one or more processors 27 may be implemented as a single or plurality of processors working together, or independently, to execute the logic as described herein. Exemplary embodiments of the one or more processors 27 may include, but are not limited to, a digital signal processor (DSP), a central processing unit (CPU), a field programmable gate array (FPGA), a microprocessor, a multi-core processor, and/or combinations thereof, for example. The one or more processors 27 may be capable of communicating via the network 12 or a separate network (e.g., analog, digital, optical, and/or the like) via one or more ports (e.g., physical or virtual ports) using a network protocol. It is to be understood, that in certain embodiments, using more than one processor, the processors 27 may be located remotely from one another, in the same location, or comprising a unitary multi-core processor. The one or more processors 27 may be capable of reading and/or executing processor executable code and/or capable of creating, manipulating, retrieving, altering, and/or storing data structure into one or more memories (e.g., memory 18 shown in FIG. 3).

The one or more memories 18 may be capable of storing processor executable code. Additionally, the one or more memories 18 may be implemented as a conventional non-transient memory, such as, for example, random access memory (RAM), a CD-ROM, a hard drive, a solid state drive, a flash drive, a memory card, a DVD-ROM, a floppy disk, an optical drive, combinations thereof, and/or the like, for example.

In some embodiments, the one or more memories 18 may be located in the same physical location as the computer system 26, Alternatively, the one or more memories may be implemented as a "cloud memory" (i.e., one or more memories may be partially or completely based on or accessed using a network, for example).

Referring to FIGS. 1 and 3, the one or more memories 18 may store processor executable code and/or information comprising one or more databases and program logic. In this embodiment, the database is hosted by the computer system 26 and stores data indicative of the inventory 16 identifying one or more devices 14 using or having used the network 12.

In some embodiments, the network 12 may use network topographies and/or protocols including, but not limited to, Ethernet, TCP/IP, circuit switched paths, and/or combinations thereof. For example, in some embodiments, the network 12 may be implemented as a local area network (LAN), a wide area network (WAN), a metropolitan network, a wireless network, a cellular network, a Global System for Mobile Communications (GSM) network, a code division multiple access (CDMA) network, a 3G network, a 4G network, a satellite network, a radio network, an optical network, a cable network, combinations thereof, and/or the like. It is also conceivable that in the near future, embodiments of the present disclosure may use more advanced networking topologies and/or protocols.

The computer system 26 may be capable of interfacing and/or communicating with the one or more devices 14 via the network 12. Additionally, the one or more processors 27 of the computer system 26 may be capable of communicating with each other via the network 12 and/or one or more additional networks.

The computer system 26 may be implemented in a variety of ways including, but not limited to, a personal computer, a smart phone, a network-capable television set, a television set-top box, a tablet, an e-book reader, a laptop computer, a desktop computer, a network-capable handheld device, a server, a wearable computer, a ubiquitous computer, combinations thereof, and/or the like. In some embodiments the computer system 26 may be included within a router 28, and/or a processor capable of executing the logic as described herein may be included within the router 28.

In some embodiments, the computer system 26 may include one or more input devices 30 and one or more output devices 32. The one or more input devices 30 may be capable of receiving information input from a user, processors, and/or environment, and transmit such information to the processors 27 and/or network 12. The one or more input devices 30 may include, but are not limited to, implementation as a keyboard, touchscreen, mouse, trackball, microphone, fingerprint reader, infrared port, slide-out keyword, flip-out keyboard, cell phone, PDA, video game controller, remote control, network interface, speech recognition, gesture recognition, eye tracking, brain-computer interface, combinations thereof, and/or the like.

The one or more output devices 32 may be capable of outputting information in a form perceivable by a user and/or processor(s) 27. For example, the one or more output devices 32 may include, but are not limited to, implementations as a computer monitor, a screen, a touchscreen, a speaker, a website, a television set, a smart phone, a PDA, a cell phone, a fax machine, a printer, a laptop computer, an optical head-mounted display (OHMD), combinations thereof, and/or the like. It is to be understood that in some exemplary embodiments, the one or more input devices 30 and the one or more output devices 32 may be implemented as a single device, such as, for example, a touchscreen or a tablet.

In use, the computer system 26 may execute the program logic controlling the reading, manipulation and/or storing of the device cache 21, properties of the device cache 21, and wireless session counts.

In some embodiments, the computer system 26 may include a detection agent (e.g., one or more processors 27) configured to detect one or more devices 14 using the network 12 at one or more pre-determined instants of time. The detection agent may send a broadcast request (e.g., an Address Resolution Protocol (ARP)) to one or more devices 14 on the network 12 or a subnetwork. For example, if the network 12 includes the IP address (192.168.1.1-254), the detection agent may send ARP broadcasts for IP addresses (192.168.1.1), (192.168.1.2), (192.168.1.3) . . . (192.168.1.254), with the ARP broadcast querying which device 14 (e.g., Mac address, for example), is at each of the IP addresses included. The detection agent may then analyze reply responses from each device 14 on the network 12 or subnetwork, for storage in the inventory 16. Based on data in the inventory 16, properties for each device 14 in the inventory may be analyzed and/or manipulated (e.g., Mac Address for a specific time).

In some embodiments, the detection agent may send a broadcast request (e.g., an Address Resolution Protocol (ARP)) to one or more devices 14 on the network 12 or a subnetwork at one or more pre-determined time interval. For example, the detection agent may send a broadcast request to one or more devices 14 on the network 12 or subnetwork every 5 minutes. In another example, the detection agent may send a broadcast request to one or more devices 14 on the network 12 or subnetwork at each hour, half hour, minute interval, and/or combinations thereof.

In some embodiments, the detection agent may first empty local ARP cache prior to sending a request to each IP address. In this embodiment, after each device 14 on the network 12 has been sent the request, the IP addresses of each device 14 found in the local ARP cache may be stored in the inventory 16. The inventory 16 may be stored, for example, in a text file, in memory, in a robust database application (e.g., sqlite), and/or in a database server (e.g., mysql).

Referring to FIG. 2, data in the inventory 16 may be stored in the memory 18 (e.g., cloud or other bulk storage system). In some embodiments, data in the inventory 16 may be stored via a data warehousing system capable of storing large amounts of data. Alternatively, data in the inventory 16 may be stored via a single database per user (e.g., customer).

In some embodiments, the detection agent may send data in the inventory 16 to a cloud through the use of an application programming interface (API). For example, data in the inventory 16 may be sent to the cloud using an API method known as Send Device, found at http://www-.whoisonmywifi.net/api/v100. SendDevice expects a JavaScript Object Notation (JSON) representation of local inventory on the device 14 for a particular user. The detection agent may connect to the API, authenticate as an agent for a particular user, and then call the SendDevice API method with the local inventory in JSON format. Detection agents can currently connect to the API using Representational State Transfer (REST) or Simple Object Access Protocol (SOAP).

In some embodiments, the API may be integrated within hardware of the wireless session counting system 10 as a plug-in or as an API plug-in. For example, the router 28 and/or access points may include software and/or firmware integrated within the hardware and configured to determine client devices 14 on the network 12. For example, the software and/or firmware may determine the number and identity of wireless sessions in the manner described above or in other manners determined by the manufacturer of the hardware. In some embodiments, one or more snapshots (i.e., collections of information at discrete moments in time) of data related to the client devices 14 on the network 12 may be collected and sent to an API located within the cloud as described herein. In some embodiments, the API may be integrated within the server 29 on the network 12. One or more snapshots of data related to a listing of addresses having DHCP leases may be obtained from the server 29. For example, the server 29 (e.g., DHCP-server) may provide a lease for each address to each client device 14. Prior to expiration of the lease, the server 29 renews the lease such that the client device 14 must obtain a new lease. As such, by decreasing the time of the lease, a snapshot of data may be collected of which client devices 14 have leases in a snapshot manner. These snapshots of data may be collected and set to an API located within the cloud as described herein. It should be noted that other methods may be used to connect to an API. Further, it should be noted that other methods may be used to transfer data in the inventory 16 to the memory 18.

In some embodiments, the detection agent may anonymize the inventory 16 via one or more cryptographical methods prior to sending the inventory 16 to the cloud. For example, original Mac Addresses in the inventory 16 may be appended to a Per Agent Privacy Key (i.e., cryptographic salt). The combination of the Mac Addresses and Privacy Key(s) may then be one-way encrypted through a cryptographic hash function (e.g., Secure Hash Algorithm 1 (SHA1)), and/or other encryption method. Characters of the resulting cryptographic hash function may then be sent in place of the original MAC addresses. For example, the final twelve characters of a resulting SHA1 may be sent in place of the original MAC addresses. As such, wireless sessions may be tracked while preserving anonymity of the devices 14 (e.g., Mac addresses of the devices 14 may be determined only via the Privacy Keys).

Referring to FIG. 3, in some embodiments, the data in the inventory 16 may be stored into one or more time specific device snapshots 20. For example, time specific device snapshots 20 may be stored as S3 text files in Amazon S3 (Amazon S3 (Simple Storage Service)), or other file storage service, with a specific timestamp, and/or contain additional metadata about the time specific device snapshot 20 stored in Amazon DynamoDB, or other NoSQL database service. Alternatively, in some embodiments, data in the inventory 16 may be stored via a logging system. For example, data in the inventory 16 may be stored in log file (e.g., text file).

In some embodiments, the device cache 21 may be stored in a MySQL database table for a specific user. In some embodiments, storage of the time specific device snapshots 20 and the device cache 21 may be accomplished synchronously by parsing data by the API at the time that the API SendDevice call is made. Storage may be asynchronous as well by first storing the time specific device snapshot 20, then running an asynchronous process later to review unchecked snapshots and update the device cache 21 at that time. Additionally, data may be further parsed and updated within the device cache 21.

Referring to FIG. 4, a user may modify one or more properties 25 of one or more entries 23 of the device cache 21. Generally, the user interface 22 may be provided via a graphical user interface (e.g., via web page, network page, local page). For example, the user interface 22 may be an HTML webpage, with php server code to edit entries 23 of the device cache 21 in a MySQL database. The user interface 22 may be used to change values within the one or more properties 25. For example, in some embodiments, the property 25, "Hide from Session Count", may be selected to have specified devices 14 be included in or excluded from further analysis (e.g., wireless session count).

Figure 5:
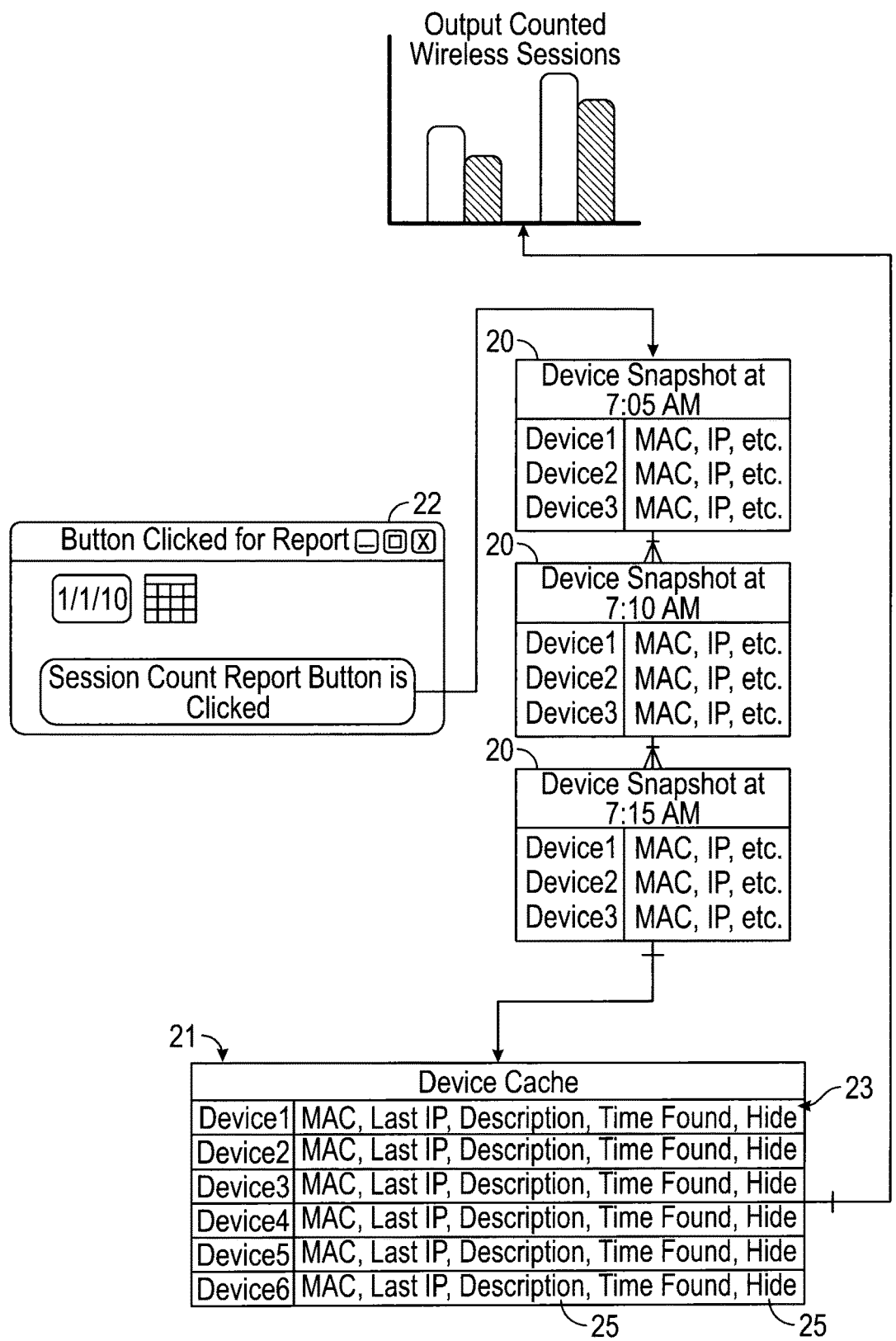
FIG. 5 is a schematic diagram of a toggle for initiating a session count report using one or more device snapshots and a device cache.

Referring to FIGS. 5 and 6, generally, the time specific device snapshots 20 and the device cache 21 may be used to determine and provide a total for wireless sessions resulting in one or more session count reports 24. In some embodiments, a user may initiate the determination of wireless sessions via a toggle 36 (e.g., button).

In some embodiments, data may be ordered via a first in-first out system wherein the first time that a first device 14 is identified in the time specific device snapshots 20, a new wireless session may be created. The wireless session may be considered to be continuing until the same device 14 has not been seen for a pre-determined amount of time. If the device 14 is seen again after a given period of time, a new wireless session (e.g., second wireless session) may be created. The new wireless session will be considered to be continuing until the device 14 has not been seen for the pre-determined amount of time (e.g., an hour). All wireless sessions may then be summed for a pre-determined time period and provided in the session count report 24.

FIG. 6 illustrates an exemplary screenshot 38 of the session count report 24. The session count report 24 may include a listing of one or more sessions 40 for devices 14 using the network 12 (shown in FIG. 1). The listing may include fields such as, but not limited to, record type, session date, IP address, device description, session start time, session end time, device detected count, and/or the like. Additionally, a total session count 42 for a pre-determined time period may be provided. For example, in FIG. 6, the total session count 42 for the time period between 7:02 PM and 11:57 PM resulted in nine devices 14 using the network 12.

Additionally, modifications to the device cache 21 may be included within the analysis for the session count report 24. Modifications to the device cache 21 may provide wireless session counts based on user criteria. For example, if the user opts to "Hide" the device 14 from analysis, a wireless session count will not be created for the device 14. FIG. 7 is a screenshot 44 showing devices 14 detected on the network 12. The user may select one of the devices 14 detected on the network 12, and the user interface 22 illustrated in the screenshot 46 of FIG. 8 may be provided. The user may then modify one or more properties 25 of one or more entries 23 in the user interface 22. For example, in FIG. 8, the user opts to "Hide from Session Count" the device 14 known as The 404. Hiding the device 14 known as The 404 from analysis for the session count results in an updated session count report 24a shown in a screenshot 50 within FIG. 9. The session 40a for the device known as The 404 is removed from the total session count 42, shown in FIG. 6, such that count is reduced by one for an updated total session count 42a of eight.

In another example, if a visitor to the wireless network 12 joins the network 12 at 10 AM, leaves the network 12 at 11 AM, joins again at 2 PM, and leaves at 5 PM, the user may modify the device cache 21 such that this visitors wireless session count is 1 session (per day), 2 sessions (default, unseen for 1 hour), or 4 sessions (calculate a session per each hour) depending on user criteria and needs.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A method for determining wireless session counts, comprising:
   probing a wireless network at a series of first periods of times to create a first inventory of devices connected to a wireless network at each of the first periods of time, the first inventory including a device identification for each device connected to the wireless network and a time of the probe,
   creating a wireless session for each respective device connected to the wireless network responsive to the first inventory of devices indicating an instance of the first one of the devices connecting to the wireless network within a second period of time such that the wireless session is a unit for tracking a length of time each respective device is connected to the wireless network;
   creating a second inventory of the respective devices having wireless sessions on the wireless network;
   storing the second inventory into a device cache, the device cache having at least one entry with each entry having at least one property;
   modifying at least one property of the device cache for at least one of the respective devices within the second inventory to a hide from session count property;
   determining a total wireless session count for wireless sessions on the wireless network during a pre-determined time interval using the second inventory and excluding from the total wireless session count any of the respective devices having the hide from session count property, such that the total wireless session count tracks length of time each respective device is connected to the wireless network; and,
   providing the total wireless session count in a session count report.

2. The method of claim 1, further comprising the step of probing the wireless network by using the wireless network.

3. The method of claim 2, wherein probing the wireless network includes the steps of:
   sending a broadcast request to respective devices on the network; and,
   analyzing at least one reply response from the respective device on the network for creation of the first inventory.

4. The method of claim 3, wherein the broadcast request is sent to the respective devices on the wireless network based on the first periods of time.

5. The method of claim 4, further comprising the steps of:
   erasing a local cache prior to sending the broadcast request to the respective devices;
   storing the reply responses from the respective devices in the local cache; and,
   analyzing the reply responses on the local cache to create the first inventory.

6. The method of claim 1, wherein the second inventory is created via a first in-first out system such that a first wireless session is created only at a first time the respective device is connected to the wireless network.

7. The method of claim 1, wherein the series of first periods cumulatively extend over an amount of time exceeding a third period of time of the first periods being less than the third period of time; and, creating the wireless session for each respective device connected to the wireless network responsive to the first inventory of devices indicates an instance of the first one of the devices connecting to the wireless network within the second period of time and not disconnecting from the wireless network for the third period of time, the second period of time greater than the third period of time.

8. The method of claim 7, wherein the second inventory is created via a first in-first out system such that a first wireless session is created only at a first time the respective device is connected to the wireless network after the respective device has not been connected to the wireless network for the third period of time.

9. A wireless counting session system, comprising:
   a first non-transitory memory device storing one or more instructions that, when executed by a first processor, cause the first processor to:

receive an inventory of at least one device using a wireless network at a pre-determined time;

store the inventory into at least one device snapshot and a device cache, the device cache having at least one entry with each entry having at least one property;

modify at least one property of the device cache for at least one of the respective devices within the inventory to a hide from session count property;

determine a total wireless session count for the wireless network for a pre-determined time interval including the pre-determined time using the at least one device snapshot, wireless sessions within the total wireless session count being determined by a respective device being connected to the wireless network after the respective device has not been connected to the wireless network for a predetermined period of time and excluding from the total wireless session count any of the respective devices having the hide from session count property; and, provide the total wireless session count in a session count report.

10. The wireless counting session system of claim 9, further comprising a router communicating on the wireless network, the router configured to:

collect data related to the at least one device using the wireless network to create the inventory;

create the inventory using the collected data; and, send the inventory to an application programming interface (API) located on the non-transitory memory device.

11. The wireless counting session system of claim 10, further comprising a server communicating on the wireless network, the server configured to:

collect data related to the at least one device using the wireless network to create the inventory;

create the inventory using the collected data, and, send the inventory to an application programming interface (API) located on the non-transitory memory device.

12. The wireless counting session system of claim 11, wherein the data collected includes a listing of DHCP leases.

13. The wireless counting session system of claim 12, wherein the server is further configured to:

decrease time of each DHCP lease on the server; and, obtain a snapshot of data of devices using the wireless network having DHCP leases, the snapshot of data used to create the inventory.

14. The wireless counting session system of claim 9, further comprising a second non-transitory memory, storing one or more instructions that, when executed by a second processor, cause the second processor to:

anonymize the inventory; and, send the anonymized inventory to the first non-transitory memory.

15. The wireless counting session system of claim 9, wherein data in the inventory is stored into at least one time specific device snapshot.

16. The wireless counting session system of claim 9, wherein one or more instructions that, when executed by a first processor, cause the first processor to modify at least one property of the device cache.

17. The wireless counting session system of claim 16, wherein modification of at least one property of the device is based on user criteria affects the total wireless session count.

18. A method for determining wireless session counts, comprising:

creating an inventory of a plurality of devices, the devices using a wireless network at a pre-determined time;

sending the inventory to a cloud through the use of an application programming interface (API);

storing the inventory into at least one device snapshot and a device cache, the device cache having at least one entry with each entry having at least one property;

modifying the at least one property of the device cache for at least one of the plurality of devices within the inventory to a hide from session count property;

determining a total wireless session count for the wireless network for a pre-determined time interval including the pre-determined time using the at least one device snapshot, wireless sessions within the total wireless session count being determined by a respective device being connected to the wireless network after the respective device has not been connected to the wireless network for a predetermined period of time, and excluding from the total wireless session count any of the devices having the hide from session count property; and, providing the total wireless session count in a session count report.

19. The method of claim 18, wherein the API is integrated as a plug-in within a computer system using the wireless network.

20. The method of claim 18, wherein the API is integrated on a DHCP server using wireless network, the DHCP server obtaining at least one snapshot of data listing addresses having DHCP leases via the server.

* * * * *

UNITED STATES PATENT AND TRADEMARK OFFICE
CERTIFICATE OF CORRECTION

PATENT NO. : 10,505,951 B2
APPLICATION NO. : 15/584831
DATED : December 10, 2019
INVENTOR(S) : John Kerber Page 1 of 1

It is certified that error appears in the above-identified patent and that said Letters Patent is hereby corrected as shown below:

In the Specification

Column 9, Line 32: Delete "The 404," and replace with --The404.--

Column 9, Line 33: Delete "The 404" and replace with --The404--

Column 9, Line 35-36: Delete "The 404" and replace with --The404--

Signed and Sealed this
Eleventh Day of February, 2020

Andrei Iancu
*Director of the United States Patent and Trademark Office*